(12) United States Patent
Sulkowski

(10) Patent No.: US 9,789,586 B2
(45) Date of Patent: Oct. 17, 2017

(54) MULTI-STAGE GRIT RECYCLER

(71) Applicant: Sandblast Solutions, Inc., Millstone Township, NJ (US)

(72) Inventor: Tom J. Sulkowski, Millstone Township, NJ (US)

(73) Assignee: Sandblast Solutions, Inc., Millstone Township, NJ (US)

( * ) Notice: Subject to any disclaimer, the term of this patent is extended or adjusted under 35 U.S.C. 154(b) by 1 day.

(21) Appl. No.: 14/933,605

(22) Filed: Nov. 5, 2015

(65) Prior Publication Data

US 2017/0129074 A1    May 11, 2017

(51) Int. Cl.
*B24C 9/00* (2006.01)

(52) U.S. Cl.
CPC .................... *B24C 9/006* (2013.01)

(58) Field of Classification Search
CPC ........... B24C 3/065; B24C 3/067; B24C 9/00; B24C 9/006; B24C 1/003
See application file for complete search history.

(56) References Cited

U.S. PATENT DOCUMENTS

| 3,694,964 | A | * | 10/1972 | Bowling, Jr. | ............. | B24C 9/00 |
| | | | | | | 451/88 |
| 3,742,650 | A | * | 7/1973 | Graf | ........................ | B24C 9/006 |
| | | | | | | 451/101 |
| 3,934,374 | A | * | 1/1976 | Leliaert | ................... | B24C 9/006 |
| | | | | | | 451/88 |
| 5,269,424 | A | * | 12/1993 | Lyras | ..................... | B24C 9/006 |
| | | | | | | 209/2 |

* cited by examiner

*Primary Examiner* — Dung Van Nguyen
(74) *Attorney, Agent, or Firm* — Lerner, David, Littenberg, Krumholz & Mentlik, LLP

(57) ABSTRACT

A system and method for grit recycling includes a first stage and a second stage. The first stage includes a first apparatus adapted to coarsely separate reusable grit from waste material. The second stage is positioned adjacent the first stage such that the coarsely separated reusable grit from the first outlet of the first stage is automatically input to the second stage. The second stage includes a second apparatus adapted to finely separate the reusable grit from the waste material.

20 Claims, 6 Drawing Sheets

MULTI-STAGE GRIT RECYCLER

BACKGROUND

Abrasives, such as steel grit, may be used for various jobs, such as the removal of paint or other coatings. When the job is complete, the abrasive may be intermixed with debris, such as paint chips, dirt, waste, rust, etc. Rather than allowing the grit/debris mixture to go to the environment, the grit can potentially be cleaned and reused. However, current systems for cleaning and recycling grit from a grit/debris mixture produce a relatively dirty grit, which is a less effective abrasive and a potential environmental hazard.

BRIEF SUMMARY

A grit recycling system includes a first stage, the first stage including a first apparatus adapted to coarsely separate reusable grit from waste material, the first stage including an inlet, a first outlet for the coarsely separated reusable grit, and a second outlet for the waste material. The system further includes a second stage positioned adjacent the first stage such that the coarsely separated reusable grit from the first outlet of the first stage is automatically input to the second stage, the second stage including a second apparatus adapted to finely separate the reusable grit from the waste material, a third outlet for the finely separated reusable grit, and a fourth outlet for the waste material. In some examples, the first stage and the second stage are held in vertical alignment by one or more support structures. The first stage may include a screened auger, while the second stage includes a magnetic drum adapted to alternate polarity.

Further, a method of recycling grit includes inputting dirty grit to a first stage grit recycling machine, coarsely separating reusable grit from waste material by the first stage grit recycling machine, automatically feeding the coarsely separated reusable grit from the first stage recycling machine to a second stage recycling machine, finely separating the reusable grit from the waste material by the second stage grit recycling machine, and outputting the finely separated grit for reuse. Coarsely separating the reusable grit may include filtering the reusable grit through a screened auger positioned above the second stage, and automatically feeding the coarsely separate grit from the first stage to the second stage may be performed by channeling the coarsely separate grit exiting though a screen of the screened auger to the second stage. Finely separating the reusable grit may be performed by rotating the reusable grit at least partially around a magnetic drum having alternating polarity, and channeling the reusable grit that remains coupled to the magnetic drum without gravitational force to an outlet for finely separated grit.

Even further, an apparatus for grit recycling includes a first housing, including a first inlet, a first outlet, and a second outlet, a first filter disposed within the first housing, a second housing including a second inlet, a third outlet, and a fourth outlet. The second housing may be positioned below the first housing such that the first outlet of the first housing is adapted to feed into the second inlet of the second housing. A second filter is disposed within the second housing, and at least one power supply is electrically coupled to the first filter and the second filter. The first filter may include a screened auger, and the second filter may include a magnetic drum adapted to alternate polarity. The second filter may also include a dust collector, such as a vacuum. The dust collector may be adapted to pull dust particles and extremely fine debris, leaving clean grit.

DETAILED DESCRIPTION

The present disclosure relates to a multi-stage system and method for recycling used grit.

Figure 1:
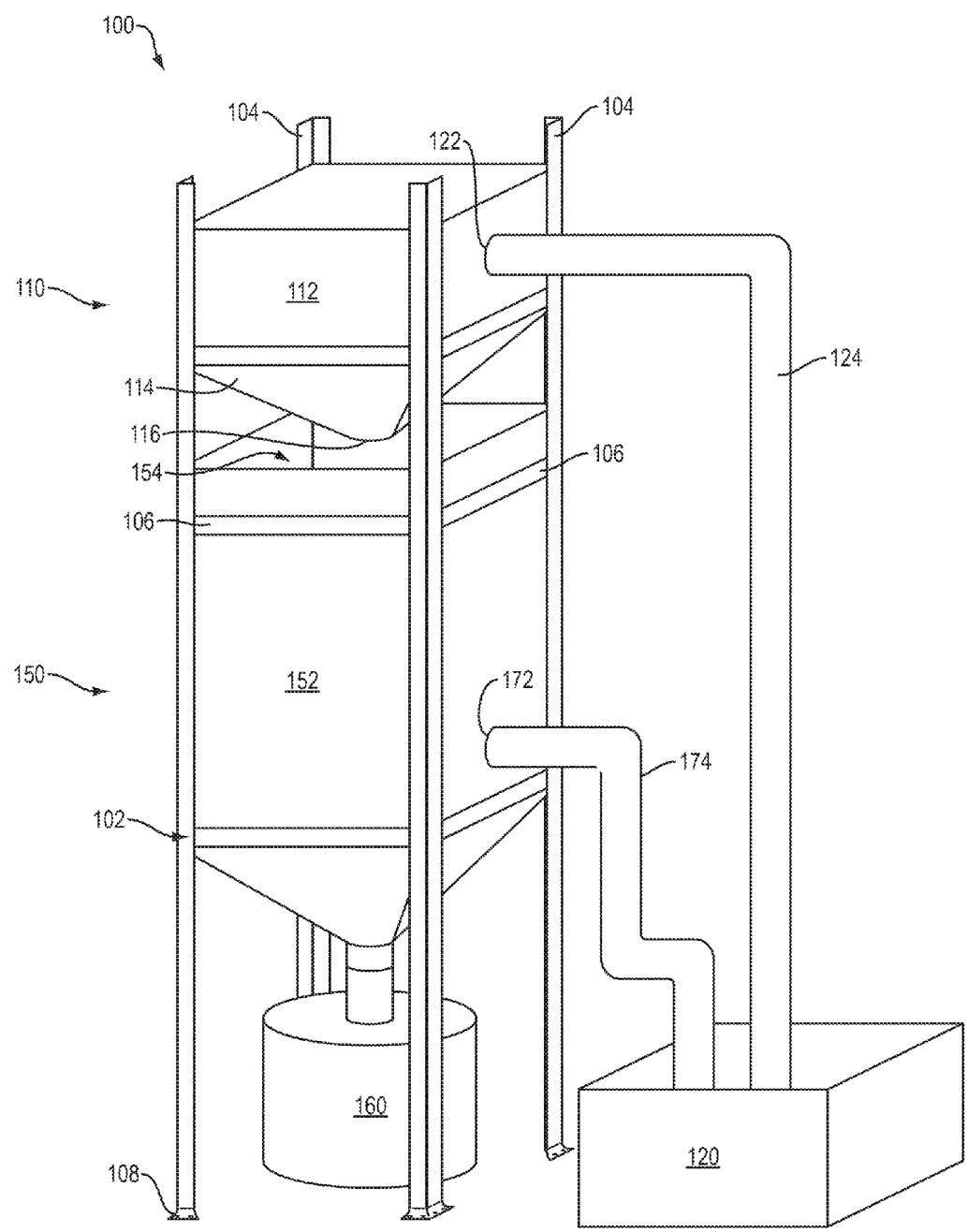
FIG. 1 is a perspective view of a system in accordance with an embodiment.

FIG. 1 illustrates an example multi-stage system 100. A first stage 110 is adapted to coarsely separate debris from used grit, and a second stage 150 is adapted to more finely separate the debris from the used grit. Resulting clean grit may be channeled into container 160, while separated debris may be channeled into one or more containers 120.

As shown in the example system 100, the first stage 110 is positioned vertically above the second stage 150. In this regard, material from the first stage 110, such as recycled grit, may be channeled into an inlet of the second stage 150 at least partially using gravity. For example, a first housing 112 of the first stage 110 may include a generally funneled bottom portion 114 and an outlet 116. The outlet 116 may be positioned above an inlet 154 of housing 152 of the second stage 150.

The first stage 110 may be supported in alignment with the second stage 150 using, for example, support structure 102. The support structure 102 may be made of steel, aluminum, plastic, or any other type of material. It may include a plurality of vertical stanchions 104, as well as a plurality of crossbars 106. The stanchions 104 and crossbars 106 may be positioned to secure housings 112, 152 for the first and second stages, respectively. While in some examples the support structure 102 may be fastened to the housings 112, 152, for example by welding or bolting, in other examples the housings 112, 152 may rest on top of the crossbars 106, may be secured by an interference fit, or may be secured by any other technique.

The support structure 102 may rest on or be secured to the ground, a platform, or any other resting surface. For example, the stanchions 104 may include feet 108 to stabilize the system 100 on the resting surface. In some examples, additional securing mechanisms, such as rods, bolts, etc., may be used.

While FIG. 1 shows the first stage 110 and the second stage 150 in vertical alignment, other configurations are possible. For example, the grit outlet 116 may be positioned at a different portion of the housing 112, and the coarsely separate grit may be carried to an inlet of the second stage by a tube or other vessel.

Each of the first stage 110 and the second stage 150 may include one or more devices for cleaning grit. Some example devices are described in further detail below in connection with FIGS. 2-5. While two stages are shown in FIG. 1, it should be understood that additional stages may also be included. By way of example only, a third stage may be included before the first stage, after the second stage, or between the first and second stages.

The first housing 112 and second housing 152 may be made of metal, plastic, or any other preferably durable material. While the housings are shown in FIG. 1 as being generally cuboidal in shape, other shapes are also feasible, such as cylindrical, funnel-shaped, etc. Each housing 112, 152 may also include a waste outlet 122, 172. The waste outlets 122, 172 may be coupled to outlet pipes 124, 174, respectively. The outlet pipes 124, 174 may be rigid or flexible, and may each have a channel suitable sized to carry waste from the housings 112, 152 to one or more containers 120.

In some examples, the multi-stage grit recycler 100 may include additional components for adapting the recycler 100 to other systems. For example, a unit may be coupled to the first stage for inputting the grit/debris mixture directly from another machine, such as a vacuum, a conveyor, a bucket elevator, etc.

Figure 2:
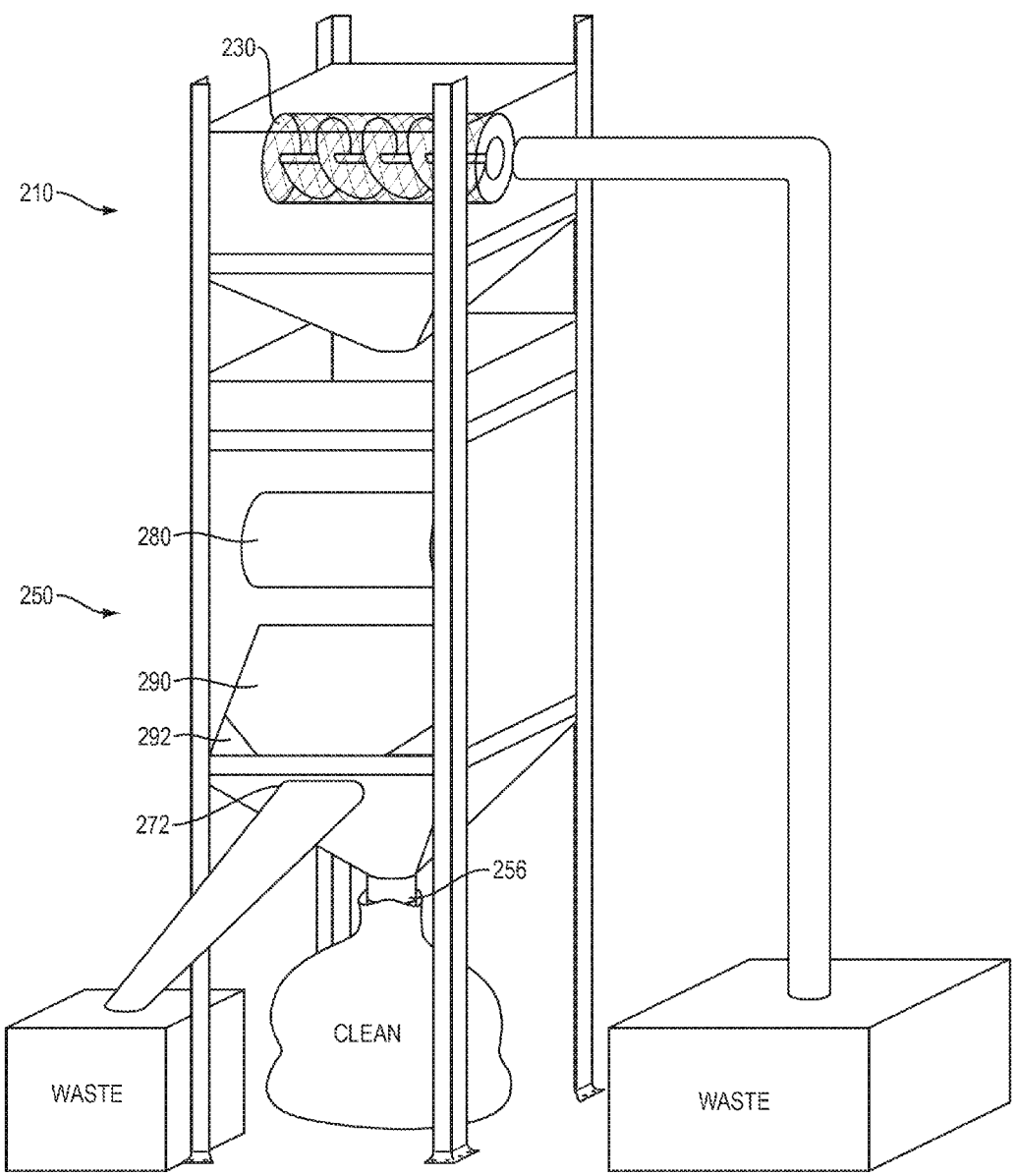
FIG. 2 is an internal perspective view of an example system in accordance with an embodiment.

FIG. 2 illustrates an example of internal mechanisms in first stage 210 and the second stage 250. In this example, the first stage 210 includes a screened auger 230, described in further detail in FIG. 3. The second stage 220 includes a magnetic drum 280, described in further detail in FIGS. 4-5.

The second stage 250 may further include a divider 290 facilitating separation of the waste and grit and channeling the waste to one outlet 272 and the recycled grit to another outlet 256. The divider 290 may further include guides 292 for directing the grit or waste. For example, the divider may be a relatively thin section of material positioned at least partially at an angle with respect to a vertical axis of the housing, such that the divider is tilted in a first direction. The guides 292 may be positioned on a top surface of the divider towards a lower end. The guides 292 may also be angled with respect to a vertical axis of the housing, but tilted in a second direction different from the first direction.

Figure 3:
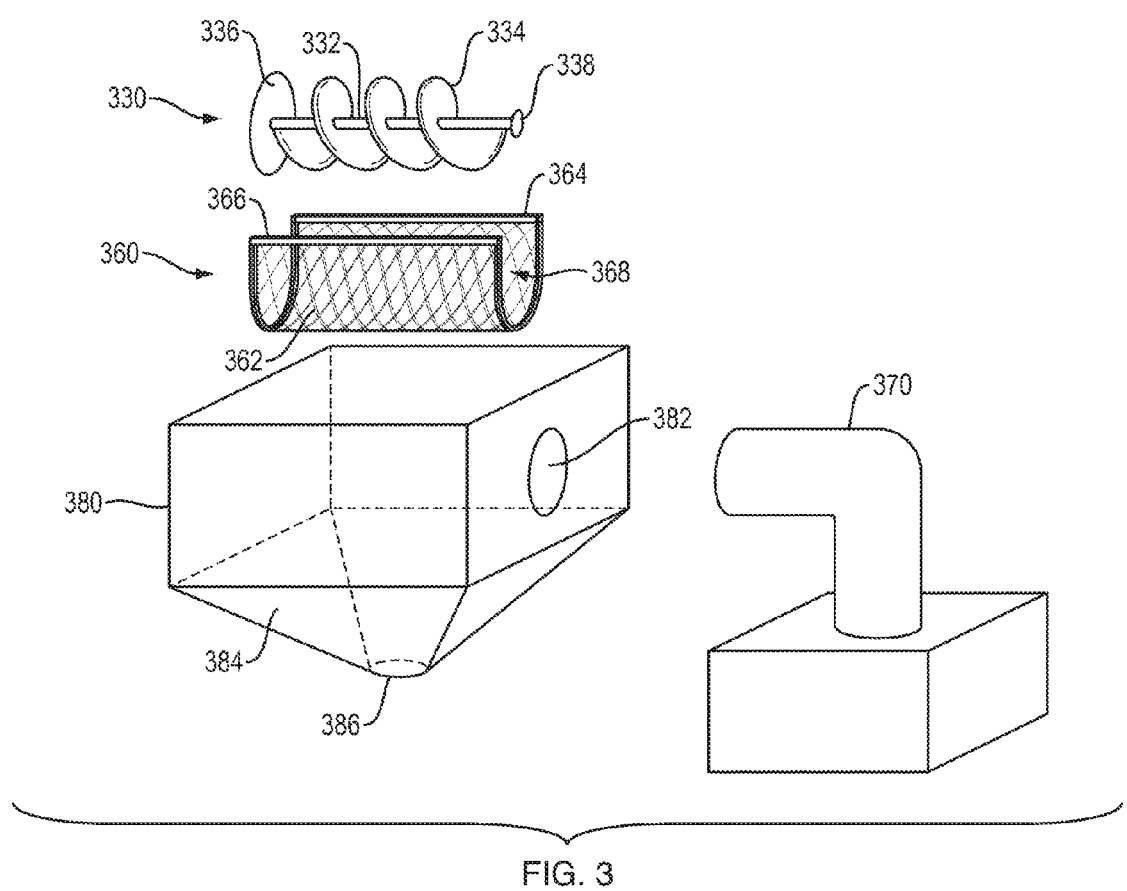
FIG. 3 is an exploded view of a first stage of the system of FIG. 2.

FIG. 3 provides an exploded view of an example first stage filter. In this example, the first stage filter is a screened auger. Accordingly, the first stage includes auger 330, 360, housing 380 and discharge 370.

The auger 332 includes a shaft 332, and a blade 334 which winds around the shaft 332. While the blade 334 shown in FIG. 3 is relatively thin, the thickness of the blade 334 may be varied. At a first end of the shaft 332, an end piece 336 may be fixed. The end piece 336 may be sized to fill nearly an entire opening 368 at a corresponding end of the screen 360. A second end of the shaft 332 may have a smaller end piece 338. In this regard, as the auger 330 operates, the blade 334 turns, pushing material either through mesh 362 of screen 260, or past the second end piece 338 and through opening 368 of the screen 360.

The auger 332 may be powered by a motor (not shown). For example, the motor may be coupled to the first end of the shaft 332 near end piece 336, and may cause the shaft 332 to rotate about its longitudinal axis. The motor may be powered by, for example, electricity, gas, or other power sources. In some examples, the auger may be coupled to a numerical control unit. Accordingly, operation of the auger may be programmed such that it is virtually automated.

The screen 360 may have a generally U-shaped cross-section. An upper portion of the U-shape may have rails 364, 366. In some examples, the rails 364, 366 may be used for securing the screen 360 to housing 380, or for preventing debris from falling past the screen 360 without going through mesh 362. The mesh 362 may wrap around a lower portion of the U-shape. The mesh 362 may be knit closely enough to allow clean grit to fall through its holes, while preventing larger debris from falling through. Instead, the larger debris is pushed out through opening 368.

A diameter of the blade 334 may be substantially the same as a diameter of the screen 360. Similarly, a length of the shaft 332 may be approximately the same as a length of the screen 360. Moreover, the screen 360 and housing 380 may be correspondingly sized, such that a distance between rails 362, 364 is approximately the same as a distance between opposing surfaces of the housing 380. In this regard, the rails 362, 364 may contact opposing inner surfaces of the housing 380. Further, a length of the screen 360 may be approximately the same as a distance between a third inner surface of the housing including the outlet 382, and an opposing inner surface.

The opening 368 in the screen 360 aligns with outlet 382 in housing 380 when assembled. The discharge 370 may also be coupled to the outlet 382, such that a channel within the discharge 370 receives the debris pushed out of opening 368 and through outlet 382. As such, the debris may be carried away through the channel into a suitable receptacle.

The housing 380 may also include a funneled bottom portion 384, having an outlet 386 at its lowest portion. An upper end of the housing 380 may be partially or fully open. In this regard, a mixture of grit and debris may be received through the upper end of the housing 380, and be manipulated by the auger 330. Smaller articles, including the grit, will pass through holes in the mesh 362. Larger pieces of debris will be pushed out through opening 382 of the screen 360 and aligned opening 382 of the housing 380. The grit that passes through the mesh 362 is channeled towards outlet 386, where it may then be input to the second stage.

Figure 4:
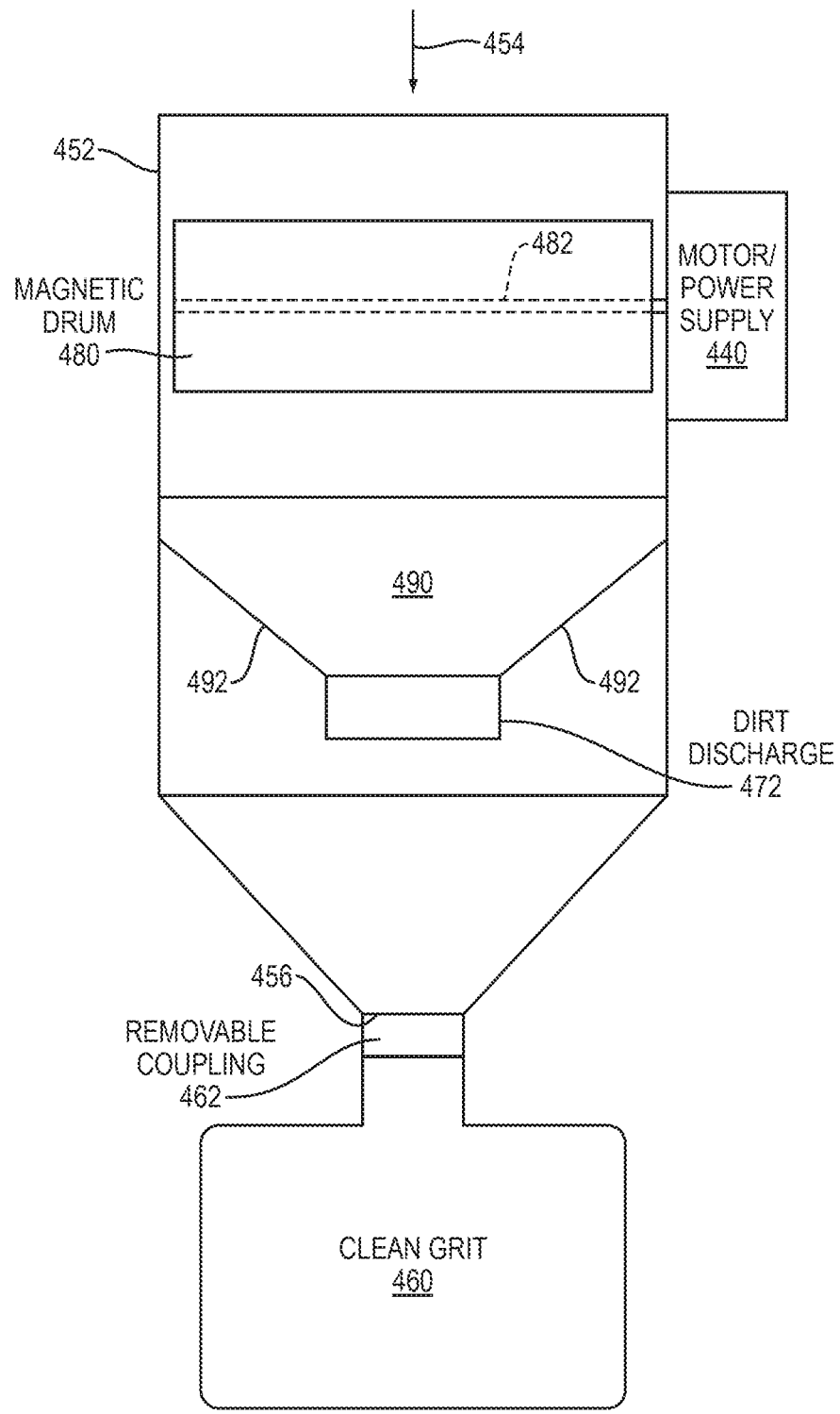
FIG. 4 is a front view of a second stage of the system of FIG. 2.

FIG. 4 shows a front view of the second stage filter shown in FIG. 2. In this example, the second stage filter includes magnetic drum 480. The magnetic drum may have a length substantially the same as a distance between a first inner surface of housing 452 and an opposing inner surface.

The magnetic drum 480 may include axis 482. A first end of the axis 482 may be coupled to a motor 440. The motor may be powered by electricity, gas, steam, or any other power source. In some examples, the first stage and the second stage may be powered simultaneously using the same power supply.

As the magnetic drum 480 is powered, it rotates about the axis 482. Coarsely separated grit output from the first stage is input to the second stage, for example, through inlet 454. The inlet 454 may be a full or partial opening at an upper portion of housing 452. The coarsely separated grit contacts the rotating drum 480. As the drum 480 rotates, debris falls off towards discharge 472, while the finer grit remains in contact with the drum. The finer grit is then released and channeled towards outlet 456, for example, by a funnel-shaped bottom portion of the housing 452. The outlet 456 may be adapted to be attached to a container 460 for the clean grit using a removable coupling 462.

The magnetic drum 480 may be, for example, an alternating polarity drum. The magnetic drum alternates polarity microscopically, causing a vibration in the grit. The grit is able to stay attached to the drum, but the fine waste/debris particles are released. The heavier waste particles drop into the discharge 472.

The second stage filter may also include a low pressure dust collection system. This may be, for example, a vacuum or blower piped into the second stage. The low power dust collection system may operate at, for example, approximately 3500 CFM. Accordingly, really fine waste such as dust or extra fine unusable grit may be sucked into the dust collector, while heavier clean reusable grit is not. While the dust collection system is described above as being included in the second stage filter, it should be understood that the dust collection system may be a separate third stage.

Figure 5:
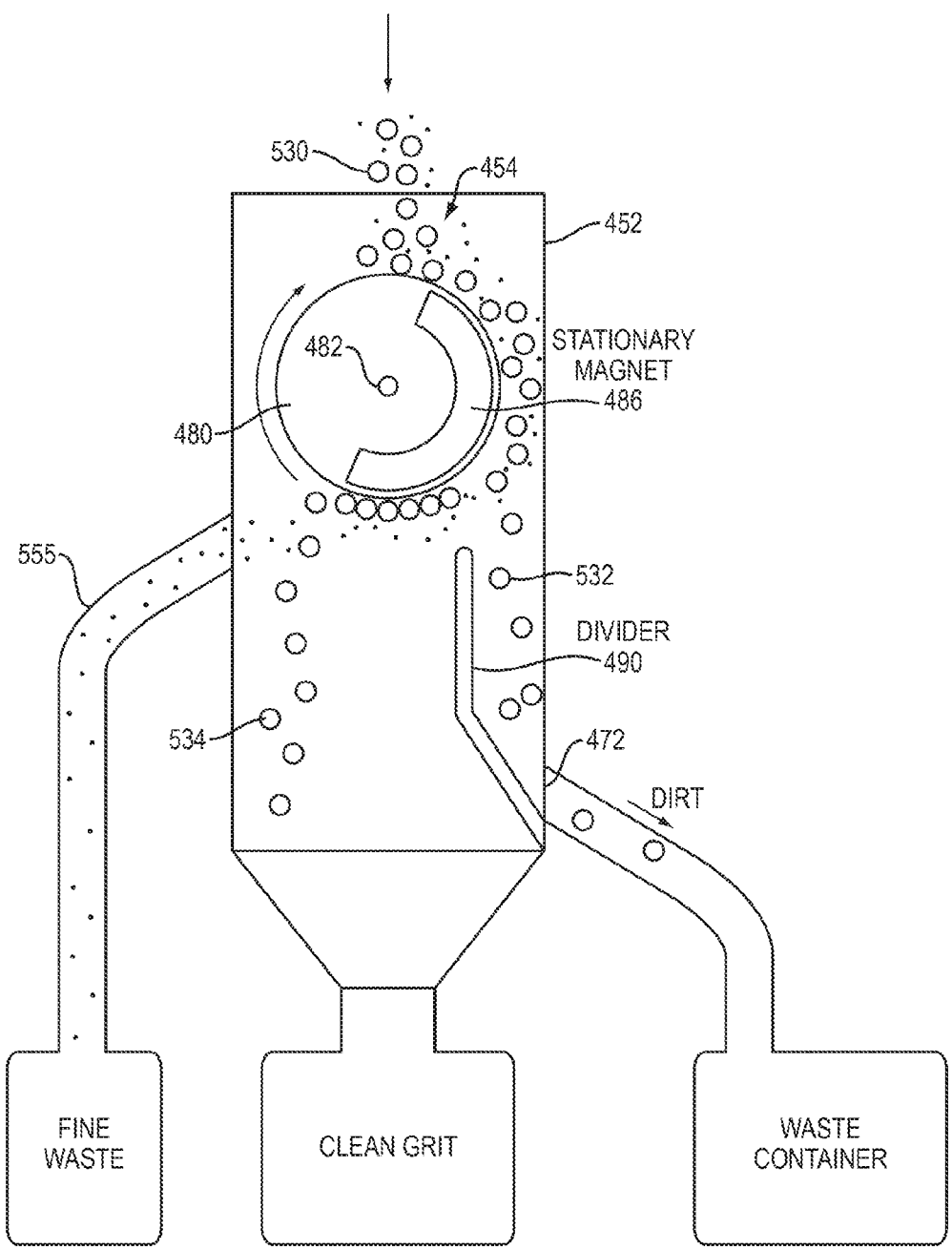
FIG. 5 is a side view of a second stage of the system of FIG. 2.

FIG. 5 provides a side view of the second stage illustrated in FIG. 4. In this illustration, the magnetic drum is processing coarsely separated grit received from the first stage. As shown, the coarsely separated grit 530 is received through inlet 434 of housing 452.

Magnetic drum 480 may have a generally cylindrical outer surface, which rotates about axis 482. The magnetic drum 480 also includes a stationary magnet 486. The magnet 486 may be positioned between an inner surface of the drum and the axis 482. As the drum 480 rotates, the coarsely separated grit 530 contacts the outer surface of the drum. Debris 532 that is not metallic falls off the drum 480 as it continues to rotate. In contrast, metallic material, such as clean grit 534, adheres to the drum 480 despite gravitational forces. Accordingly, the clean grit 534 does not fall off the drum until after it travels past the stationary magnet 486.

The magnetic drum 480 may have alternating polarity, resulting in vibrations. Such vibrations may cause finer waste particles to fall off the drum. Such finer waste particles may be captured by a dust collection device 555. The dust collection device 555 may be, for example, a low powered vacuum or a blower. The dust collection device is configured to capture dust particles and other finer waste particles that fall off the drum 480. The finer waste particles may be routed to a separate collection container, or into a same collection container as larger waste 532. While the collection device 555 is shown in FIG. 5 as being positioned on a portion of the second stage opposing the stationary magnet 486, it should be understood that the collection device 555 may be positioned anywhere in the housing 452 or in a separate housing (not shown).

Divider 490 separates the debris 532 from the clean grit 534. The divider 490 is positioned underneath the magnetic drum 480 and relative to an edge of the stationary magnet 486, such that non-magnetic material falls to one side and magnetic material falls to another. In FIG. 5, the divider 490 is shown is being a panel having a substantially vertical upper section and an angled lower section. In this regard, the lower section of the divider 490 helps push debris towards a waster outlet. In contrast, clean grit 534 is channeled by funnel-shaped bottom portion of the housing 452 to a separate outlet. However, the size and shape of the divider may be varied. Additionally, the configuration of the outlets may be modified. For example, the divider may be angled in opposing directions, such that it comes to a point at its upper portion. Correspondingly, the outlet for the clean grit may be positioned near a side surface of the housing 452 opposing the surface including outlet 472.

The multi-stage system described above may be configured as a portable machine. In other examples, the system may be permanently installed at a facility, such as in a factory or shop setting. Moreover, one or more of the stages may be removed. For example, the first stage may be removed if separation from large debris is not required, and the clean grit may be separated from waste through the second stage filter (e.g., alternating polarity magnetic drum) and third stage filter (e.g., dust collector).

Figure 6:
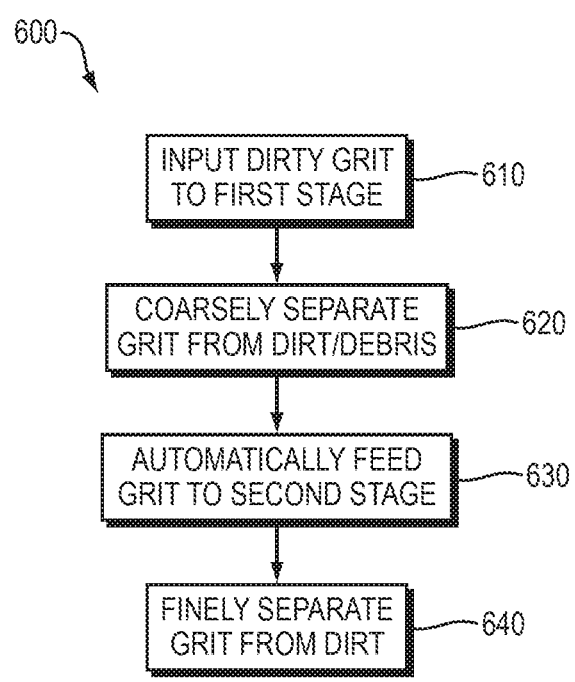
FIG. 6 is a flow diagram of an example method according to an embodiment.

FIG. 6 illustrates a method 600 for multi-stage grit recycling. While the steps are shown as being performed in a particular order, it should be understood that an ordering of the steps may be modified. Additionally, steps may be performed simultaneously. Further, steps may be added or other steps omitted.

In step 610, dirty grit is input to a first stage of the multi-stage recycler. The dirty grit may by a mixture of, for example, steel grit, dirt, and debris.

In step 620, grit is coarsely separate from debris in the first stage. The separation may be performed by a first filter, such as a screened auger. In other examples, any type of screen may be used, such as a permanent or vibrating screen. The first filter may be powered by a power supply, such that operation of the filter continues for as long as the power supply is turned on. In other examples, operation of the first filter may be controlled by a remote unit or a numerical control. As a result of the filtering, debris may be output to a waste receptacle through an outlet of the first stage.

In step 630, the coarsely separated grit is automatically fed from the first stage to a second stage of the recycler. This may be done, for example, using a funneled housing in the first stage in vertical alignment with an inlet of the second stage, as shown in FIG. 1. In other examples, the coarsely separated grit from the first stage may be channeled through a pipe, along a conveyor, or by any other vessel to an inlet of the second stage.

In step 640, the grit is finely separated from the debris in the second stage. The second stage separation may be performed using a second filter, such as a magnetic drum with alternating polarity. In other examples the second filter may include a screen, such as a screen having a finer mesh than a screen used for the first filter. The second filter may also be powered by a power supply, numerical control, etc., similar to the first filter. In some examples, the first filter and the second filter may both be powered by the same power supply/controls.

In some examples, the method further includes a separating dust or extra fine unusable grit from the clean reusable grit, such as in a third stage. A dust collector may pull or push the dust or extra fine unusable grit towards a waste outlet. For example, a low powered vacuum may be positioned beneath the second stage filter so as to pull the dust particles in a lateral direction into an outlet, while heavier reusable grit falls in a vertical direction by gravity.

Once the grit is finely separated, the clean grit may be output to one receptacle, while the dirt and debris is output to a separate receptacle. As a result, the clean grit is cleaner than grit recycled using any known methods. For example, the subject matter described herein provides for cleaner grit than can be achieved with a single stage unit. Accordingly, the recycled grit is more effective in future abrasion jobs. Moreover, the grit can be recycled numerous times. This is advantageous not only in preserving the environment, but also in reducing cost. Additionally, by performed the recycling in multiple stages, wear and tear on the filters and other components of the recycler are reduced, thus saving more cost and resources.

As these and other variations and combinations of the features discussed above can be utilized without departing from the subject matter as defined by the claims, the foregoing description of embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A grit recycling system, comprising:
   a first stage, the first stage including a first apparatus adapted to coarsely separate reusable grit from waste material, the first stage including an inlet, a first outlet for the coarsely separated reusable grit, and a second outlet for the waste material, the first stage including a screened auger including a screen having holes sized to allow the coarsely separated reusable grit to pass through the holes and into the first outlet while the waste material moves laterally toward the second outlet; and
   a second stage positioned adjacent the first stage such that the coarsely separated reusable grit from the first outlet of the first stage is automatically input to the second stage, the second stage including a second apparatus adapted to finely separate the reusable grit from the waste material, a third outlet for the finely separated reusable grit, and a fourth outlet for the waste material.

2. The system of claim 1, wherein the first stage comprises a generally cuboidal housing having a funneled bottom portion, wherein the first outlet is positioned at a bottom of the funneled bottom portion.

3. The system of claim 2, wherein the second stage comprises another generally cuboidal housing having an open top portion positioned underneath the first outlet of the first stage.

4. The system of claim 1, wherein the first stage and the second stage are held in vertical alignment by one or more support structures.

5. The system of claim 1, wherein the second stage comprises a magnetic drum adapted to alternate polarity.

6. The system of claim 1, further comprising a power supply, the power supply configured to power the first stage and the second stage simultaneously.

7. The system of claim 1, wherein the screen is formed from mesh.

8. The system of claim 7, wherein the screened auger further includes a shaft and a blade, the blade adapted to wind around the shaft.

9. The system of claim 8, wherein the shaft includes a first end piece and a second end piece, the first end piece being larger than the second end piece, the second end piece being connected to the second outlet.

10. The system of claim 7, wherein the screened auger includes two rails, the mesh attached to each of the rails and extending from the rails in a U-shape.

11. The system of claim 1, further comprising a metal support structure holding the first stage and the second stage in vertical alignment, the metal support structure comprises a plurality of vertical stanchions.

12. The system of claim 1, wherein the inlet of the first stage comprises an opening extending from a first wall of a housing of the first stage to a second opposing wall of the housing of the first stage.

13. The system of claim 12, wherein the inlet of the first stage extends across an entire top surface of the housing of the first stage.

14. An apparatus for grit recycling, comprising:
    a first housing, including a first inlet, a first outlet, and a second outlet;
    a first filter disposed within the first housing, the first filter comprising a screened auger including a screen having holes sized to allow coarsely separated reusable grit to pass through the holes and into the first outlet and to prevent waste material from passing through the holes;
    a second housing including a second inlet, a third outlet, and a fourth outlet, the second housing positioned below the first housing such that the coarsely separated reusable grit from the first outlet of the first housing is adapted to feed into the second inlet of the second housing;
    a second filter disposed within the second housing; and
    at least one power supply electrically coupled to the first filter and the second filter.

15. The apparatus of claim 14, wherein the second filter comprises a magnetic drum adapted to alternate polarity.

16. The apparatus of claim 15, further comprising a vacuum adapted to collect dust particles.

17. The apparatus of claim 15, wherein the first housing further includes a divider positioned substantially vertically beneath the magnetic drum, such that non-metallic waste material falls on a first side of the divider and metallic reusable grit falls on a second side of the divider.

18. The apparatus of claim 14, wherein the second housing further includes a coupling positioned at the third outlet, the coupling adapted to removably attach the third outlet to a container for receiving the filtered grit.

19. The apparatus of claim 14, further comprising a metal support structure holding the first housing and the second housing in vertical alignment.

20. The apparatus of claim 14, wherein the first filter is adapted to filter larger chunks of debris from the grit, and the second filter is adapted to filter finer bits of debris from the grit.

* * * * *